United States Patent [19]

Mehnert

[11] 3,782,877
[45] Jan. 1, 1974

[54] APPARATUS FOR SEPARATING THE SURPLUS OF THERMOPLASTIC MATERIAL FROM THE NECK PORTIONS OF BLOW-MOLDED CONTAINERS

[75] Inventor: Gottfried Mehnert, Berlin, Germany

[73] Assignee: Bekum Maschinenfabriken GmbH, Berlin, Germany

[22] Filed: Apr. 13, 1971

[21] Appl. No.: 133,513

[30] Foreign Application Priority Data
Apr. 28, 1970  Germany................... P 70 15 972.7
Dec. 9, 1970   Germany................... P 20 60 586.1

[52] U.S. Cl................. 425/292, 425/288, 425/302
[51] Int. Cl. ............................................. B29c 17/14
[58] Field of Search................... 425/288, 290, 292, 425/302, 305

[56] References Cited
UNITED STATES PATENTS

| 3,224,038 | 12/1965 | Budesheim..................... 425/292 X |
| 3,232,246 | 2/1966 | Nishkian......................... 425/292 X |
| 2,596,388 | 5/1952 | Elvis................................ 425/292 |

*Primary Examiner*—H. A. Kilby, Jr.
*Attorney*—Michael S. Striker

[57] ABSTRACT

The funnel-shaped surplus of thermoplastic material which is partially separated from the neck portion of a container formed in the mold of a blow molding machine is held by a sleeve which is movable axially of and surrounds the blowing mandrel. Prior to separation of the neck portion of a freshly formed container from the calibrating end of the mandrel, the neck portion and the surplus material are subjected to an intensive cooling action and the sleeve is then moved angularly and/or axially of the mandrel, or vice versa, to effect full separation of the surplus material from the neck portion. The container is thereupon separated from the mandrel prior to separation of surplus material from the sleeve, and the surplus material is deflected laterally to be collected independently of the containers.

17 Claims, 10 Drawing Figures

PATENTED JAN 1 1974            3,782,877

INVENTOR
GOTTFRIED MEHNERT
BY *[signature]*
Attorney

PATENTED JAN 1 1974 3,782,877

INVENTOR
GOTTFRIED MEHNERT
BY
ATTY

APPARATUS FOR SEPARATING THE SURPLUS OF THERMOPLASTIC MATERIAL FROM THE NECK PORTIONS OF BLOW-MOLDED CONTAINERS

BACKGROUND OF THE INVENTION

The present invention relates to an apparatus for separating the surplus of thermoplastic material from the neck portions of blow-molded plastic bottles, jars, vials or analogous containers.

It is known to employ in a blow molding machine a blowing mandrel a portion of which serves to calibrate the neck portion of a container in the cavity of the blow mold. The calibrating portion constitutes the leading end of the mandrel and cooperates with the adjacent portions of the mold sections to determine the internal diameter of the neck portion of the container. The mandrel further serves to introduce into the interior of the mold a stream of a gaseous blowing fluid which causes the expansion of a portion of a parison or blank in the mold cavity so that the expanded portion of the parison or blank forms the main body portion of a container.

The blank which is introduced into the space between the mold sections before the mold is closed must be held in such a way that a portion thereof is in an optimum position for penetration of the calibrating portion, and such portion of the blank must contain enough plastic material to insure the formation of a satisfactory neck portion. As a rule, the calibrating portion of the mandrel causes at least some radial expansion of the adjacent portion of the blank so that the expanded portion is forced against and follows the configuration of the adjacent neck-forming parts of the mold sections. Such neck-forming parts may be configurated to provide the neck portion of the container with a thread, with one or more beads and/or with one or more grooves. When the mold is opened, the neck portion of the freshly formed container normally adheres to the calibrating portion of the mandrel and must be separated from the calibrating portion by a suitable stripping device.

The mandrel is normally further provided with an annular cutting edge which cuts into the material of the blank to provide the neck portion of the container with a sharply defined end face and to effect at least partial separation of surplus material. Such surplus material normally forms a ring which is adjacent to the neck portion of the freshly formed container and must be stripped off the mandrel prior to the next blow molding operation. As a rule, the mold has a recess which is bounded by a conical surface serving as a stop for the cutting edge of the mandrel when the latter's calibrating portion is caused to penetrate into a blank in the mold cavity. It was found that the surplus of thermoplastic material tends to adhere to the neck portion of the container even though the cutting edge normally strikes against the conical surface of the closed mold. Furthermore, even if the surplus material is fully separated from the neck portion of the container, the separation of ring-shaped surplus from the mandrel presents serious problems, especially if the surplus is to be collected independently of finished containers.

It is further known to employ in a blow molding machine a plate-like stripping device having an opening which is large enough to permit unimpeded passage of the mandrel but is too small to permit passage of the container and of ring-shaped surplus. The mandrel passes through the opening when its calibrating portion penetrates into a blank in the mold and, when the mandrel is thereupon retracted, the stripping device separates the container and the ring-shaped surplus so that the mandrel is ready to perform the next working stroke. A drawback of such stripping methods is that the surplus of thermoplastic material which is normally of irregular shape, especially at that side which faces away from the neck portion of the container, is likely to cause undesirable deformation of the neck portion when it abuts against and is tilted by the stripping device while the mandrel continues to move away from the mold. The likelihood of deformation of the neck portion is especially pronounced if the material of the freshly formed container is still in a deformable state while the mandrel moves away from the open mold to advance the surplus of thermoplastic material and the container toward the stripping device. Furthermore, since the surplus is separated from the mandrel substantially simultaneously with the container, it descends by gravity along the same path as the container and is likely to be welded to the container if the stripping operation takes place while the material of the surplus and/or of the container is still in a deformable state. Still further, it is normally undesirable to collect finished containers together with the surplus of thermoplastic material because the latter must be separated from the containers for further processing.

The likelihood of adherence of surplus material to containers is particularly pronounced if the cutting edge of the mandrel is dull or uneven so that it fails to bring about a complete separation of the surplus from the respective neck portion. Even a single narrow web which connects the surplus with the neck portion suffices to prevent automatic segregation of surplus from the finished containers. As a rule, the surplus forms a ring-shaped body which resembles a funnel or calyx and tapers toward the end face of the neck portion.

It is already known to provide a blow molding machine with a separating device which includes a clamping sleeve movable axially of the mandrel and serving to grip and tear the surplus of thermoplastic material from a container. The separating device further includes strip-shaped separating elements which define a funnel-shaped opening in registry with the cavity of the mold. Reference may be had to German Utility Model No. 1,940,705. A drawback of such separating devices is that they must employ complicated and expensive parts which grip the surplus from within and from without. Moreover, such separating devices cannot be installed in existing blow molding machines; they are designed to cooperate with special types of molds which are more expensive than presently used molds. Therefore, such separating devices failed to gain widespread acceptance in the blow molding art.

SUMMARY OF THE INVENTION

An object of the invention is to provide a blow molding machine with an apparatus for complete separation of the surplus of theremoplastic material from the neck portions of containers and with means for automatic collection of surplus independently of finished containers.

A further object of the invention is to provide a surplus separating and collecting apparatus which can be built into existing blow molding machines.

Still another object of the invention is to provide a surplus separating apparatus which can be combined with presently known blowing mandrels.

Another object of the invention is to provide an automatic apparatus for segregation of the surplus of thermoplastic material from the neck portions of blow molded containers and to provide such apparatus with means for automatic separation of surplus from its support, for automatic separation of containers from the mandrel, and for automatic routing of finished containers and surplus into separate paths.

With these and other objects in view, which will become apparent as the description proceeds, the apparatus of the present invention mainly comprises an open-end-shut mold arranged to accommodate a blank of the deformable thermoplastic material, a blowing mandrel having a calibrated portion and movable axially to introduce said calibrating portion into said mold with attendant conversion of a portion of the blank in the mold into the neck portion of a container and a ring constituting a surplus of thermoplastic material which adheres to the neck portion, severing means surrounding the mandrel and arranged to cooperate with the mold to effect an at least partial separation of the surplus from the neck portion, a sleeve surrounding the mandrel and arranged to penetrate into the surplus, means for effecting a relative axial movement between the sleeve and the mandrel, to thereby completely separate the surplus which is held by the sleeve from the neck portion on the calibrating portion, means on the sleeve for retaining the surplus on the same after penetration of the sleeve into the surplus and during relative movement between the sleeve and the mandrel, and stripping means for separating the surplus from the sleeve and the means for retaining the surplus on the latter.

The novel features which are considered as characteristic of the invention are set forth in particular in the appended claims. The improved surplus separating apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
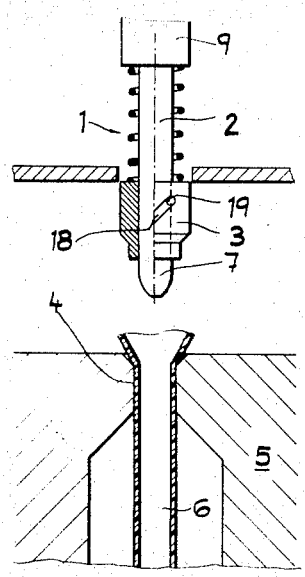
FIG. 1 is a fragmentary central vertical sectional view of a blow molding machine which is provided with a surplus separating apparatus embodying one form of the invention; the sleeve and the mandrel being shown in positions they assume prior to penetration of the calibrating portion into a deformable blank in the mold cavity.

Referring first to FIGS. 1 to 4, there is shown a portion of a blow molding machine having an open-and-shut blow mold 5 including mold sections or halves 5', 5'' which define a mold cavity 5A when the mold 5 is closed by conventional means, not shown. The mold sections 5', 5'' have neck-forming portions or parts 5B, 5C defining that region of the cavity 5A which accommodates the neck portion 14 of a finished bottle, jar or similar container 15. The main body portion of the container 15 is shown at 17. Such container is obtained in response to suitable deformation of a thermoplastic blank 6 (e.g., a tubular parison) which is introduced into the space between the mold section 5', 5'' while the mold 5 is held in the open position shown in FIG. 4. The parison 6 is held in such axial position with reference to the mold 5 that its end portion 4 yields the neck portion 14 of the finished container 15 and a substantially conical or funnel-shaped ring 12 which constitutes a surplus and is to be separated from the neck portion 14 in accordance with the present invention.

The blowing and calibrating unit 1 of the blow molding machine comprises a blowing mandrel or nozzle 2 which is movable axially of the parison 6 and has a lower or leading end portion 7 which constitutes the calibrating element and cooperates with the neck-forming parts 5B, 5C of the mold sections 5', 5'' (FIGS. 2 and 3) to shape the neck portion 14 of the container 15. The blowing mandrel 2 is surrounded by a sleeve-like cutting or severing and surplus supporting member 3 (hereinafter called sleeve for short) which performs several functions including shaping of the upper end face 13 of the neck portion 14, effecting at least partial separation of the ring 12 from the neck portion 14 in the course of the calibrating operation, retaining or holding the ring 12 during separation of the finished container 15 from the blowing mandrel 2, and cooperating with a stationary stripping device 21 to direct the ring 12 into a path which is different from the path for the finished container 15.

The annular lower end face 3a of the sleeve 3 is surrounded by a ring-shaped cutting edge 3b which can cooperate with a conical surface 11a in a customary conical recess 11 of the mold 5 to effect at least substantial separation of the ring 12 from the neck portion 14. Such separation of the ring 12 takes place while the calibrating element 7 of the blowing mandrel 2 cooperates with the neck-forming parts 5B, 5C of the mold sections 5', 5" to impart to the neck portion 14 a desired shape whereby the parts 5B, 5C determine the configuration of the external surface and the calibrating element 7 determines the configuration of the internal surface of the neck portion 14. If desired, the parts 5B, 5C can be configurated in such a way that the neck portion 14 is formed with an external thread for reception in an internally threaded cap for the container 15 or with a pronounced bead at the upper end of the neck portion 14.

Figure 2:
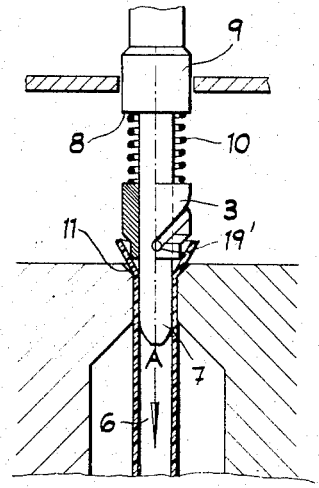
FIG. 2 illustrates the structure of FIG. 1 but showing the mandrel and the sleeve in positions they assume just before the surplus is separated and the mandrel is about to admit a blowing fluid into the partially deformed blank in the mold cavity.
Figure 3:
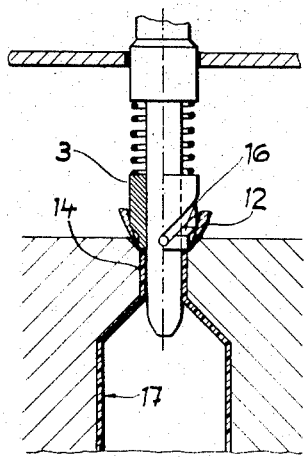
FIG. 3 shows the structure of FIG. 1 with the mandrel and sleeve in positions they assume upon completed conversion of the blank into a container.
Figure 4:
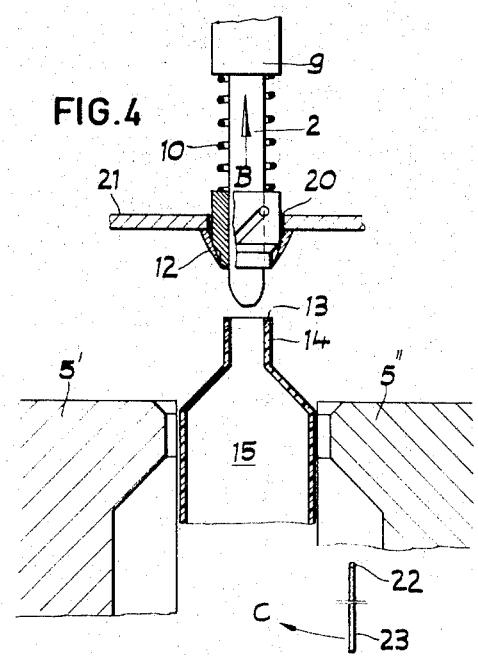
FIG. 4 illustrates the structure of FIG. 1 but with the mold in open position and with the freshly formed container already separated from the mandrel, the surplus being shown in a position immediately prior to its separation from the sleeve.

The blowing mandrel 2 is further provided with an enlarged portion or boss 9 which is axially spaced from the sleeve 3 and has a ring-shaped shoulder 8 serving as a retainer for one end convolution of a helical spring 10 which tends to bias the sleeve 3 in a direction toward the calibrating element 7 (see the arrow A shown in FIG. 2). When the end face 3a of the sleeve 3 is remote from the upper portion 4 of a parison 6, the spring 10 maintains the sleeve 3 at a maximum distance from the boss 9 (see FIG. 1). Such maximum distance is determined by a stop in the form of a pin 19 which is secured to and extends radially from the mandrel 2 into a helical groove 18 of the sleeve 3. If the unit 1 is mounted at a level above the mold 5 (as shown in FIGS. 1-4), the pin 19 is received in the upper end portion of the slot 18 when the spring 10 is free to expand. When the end face 3a of the sleeve 3 meets an obstruction (i.e., when the cutting edge 3b abuts against the portion 4 of the parison 6 or against the surface 11a of the mold 5), while the blowing mandrel 2 is caused to continue its axial movement toward the mold, the spring 10 is compressed and the pin 19 moves axially with reference to the sleeve 3 whereby the latter is caused to turn about the axis of the mandrel 2. FIG. 2 illustrates the unit 1 in a position it assumes when the pin 19 reaches its lower end position 19' with reference to the slot 18, i.e., when the spring 10 is compressed to a maximum extent. Such maximum compression of the spring 10 can take place even before the cutting edge 3b reaches the surface 11a (see FIG. 2); this is advisable in many instances in order to insure that the sleeve 3 shares the last stage of axial movement of the mandrel 2 in a direction toward the mold 5 to thus guarantee that the cutting edge 3b invariably severs the portion 4 of the parison 6 so as to cause complete or substantially complete separation of the ring 12 from the neck portion 14. FIG. 3 illustrates the blowing mandrel 2 in its lower end position in which the cutting edge 3b abuts against the surface 11a so that the ring 12 is normally separated from the neck portion 14. The cutting edge 3b provides the neck portion 14 with the smooth ring-shaped end face 13 (see FIG. 4).

The sleeve 3 further comprises a conical intermediate portion 16 which is located above the end face 3a and serves to cause at least some expansion of the ring 12 so that the latter "sticks" to the intermediate portion 16 and is retained thereon until forcibly separated from the sleeve 3 by the aforementioned stripping device 21. The intermediate portion 16 can be provided with teeth, threads or other projections 16a, which insure that the ring 12 is not accidentally separated from the sleeve 3. When the unit 1 reaches and dwells in the lower end position of FIG. 3, its parts are subjected to an intensive cooling action (which is preferably accompanied by the intensive cooling action upon the neck portion 14 of the freshly formed container 15) so that the material of the neck portion 14 and ring 12 hardens within a very short interval of time, namely, before the mandrel 2 is lifted above and away from the mold 5. Rapid cooling and the resulting hardening of ring 12 and neck portion 14 is desirable to prevent accidental bonding (welding) of the ring 12 to the neck portion during the next stages of operation of the blow molding machine and/or accidental adherence of the ring 12 to a container 15 subsequent to separation of the ring from the unit 1.

The admission of a blowing fluid into the parison 6 takes place by way of the mandrel 2 (and/or by way of one or more auxiliary injecting nozzles not shown) whereby the blowing fluid expands the lower portion of the parison 6 to form the main portion 17 of the container 15. The configuration of the main portion 17 conforms to the configuration of surfaces which surround the mold cavity 5A. The neck forming parts 5B, 5C of the mold sections 5', 5" cooperate with the calibrating element 7 of the mandrel 2 to shape and calibrate the neck portion 14. When the blowing and calibrating operation is completed, the mold 5 is caused to open (see FIG. 4) and the entire unit 1 is caused to move upwardly (arrow B in FIG. 4) whereby the calibrating element 7 carries the neck portion 14 and the intermediate portion 16 of the sleeve 3 carries the ring 12. The spring 10 is free to expand as soon as the boss 9 of the mandrel 2 starts to move upwardly above and away from the lower end position shown in FIG. 3 whereby the sleeve 3 is caused to move toward the calibrating element 7 and rotates with reference to the mandrel 2 because its helical groove 18 moves with respect to the pin 19. Thus, the ring 12 is rotated with reference to the neck portion 14 to insure reliable termination of eventually existing connection or connections between the thermoplastic material of the ring 12 and the thermoplastic material of the neck portion 14. At the same time, the end face 3a of the sleeve 3 pushes the neck portion 14 toward the lower end of the calibrating element 7 so that the finished bottle 15 descends by gravity in the axial direction of the unit 1 and enters a suitable collecting receptacle or comes to rest on or is engaged by a suitable conveyor for transport to the next processing station. The separation of the neck portion 14 from the calibrating element 7 takes place before the intermediate portion 16 of the sleeve 3 reaches a circular opening 20 of the stripping device 21. The latter constitutes a plate which is fixedly mounted in the frame of the blow molding machine. The diameter of the opening 20 is selected in such a way that the opening permits unimpeded passage of the sleeve 3 but that the surface of the underside of the stripping device 21 engages and intercepts the ring 12 and separates this ring from the sleeve whereby the ring descends and is intercepted by a deflector 23 (e.g., a flap which is pivotable in the machine frame on a pin 22) to insure that the ring 12 cannot enter the path for the container 15. The blow molding machine has suitable actuating means which can move the flap 23 in the direction indicated by the arrow C during the interval between complete separation of the neck portion 14 from the calibrating element 7 by the sleeve 3 and complete separation of the ring 12 from the intermediate portion 16 of the sleeve 3 by the stripping device 21. The flap 23 can propel or direct the ring 12 into a collecting receptacle or into a chute, not shown, for transport to a regenerating station.

It will be noted that the neck portion 14 of the freshly formed container 15 is separated from the calibrating element 7 of the blowing mandrel 2 by the ring-shaped end face 3a of the sleeve 3, i.e., by that part which imparts to the upper end face 13 of the neck portion 14 its desired shape. Therefore, the neck portion 14 cannot be deformed during separation from the calibrating element 7 since the means for separating the neck portion 14 from the mandrel 2 is the same means which imparts to the upper end face of the neck portion its desired configuration. Furthermore, since the ring 12 and the neck portion 14 are subjected to an intensive cooling action prior to movement of the unit 1 from the lower end positions shown in FIG. 3, the welding of the neck portion 14 to the ring 12 during such upward movement is either impossible or highly unlikely.

The likelihood of adherence of the ring 12 to the neck portion 14 during separation of the neck portion 14 from the calibrating element 7 is further reduced by the provision of the means 10, 18, 19 which causes the sleeve 3 to rotate with reference to the mandrel 2 during separation of the neck portion 14. The neck portion 14 does not rotate because it is a tight fit on the calibrating element 7. The ring 12 is compelled to rotate with the intermediate portion 16 of the sleeve 3 because it closely conforms to the outline of such intermediate portion and also because the latter is preferably provided with the aforementioned projections which are strong and pronounced enough to compel the ring 12 to rotate with the sleeve 3 while the slot 18 travels with reference to the pin 19 under the action of the spring 10. Rotation of the sleeve 3 with reference to the mandrel 2 is further desirable during movement of the unit 1 to the lower end position of FIG. 3 because the rotating intermediate portion 16 screws or drills itself into the readily deformable material of the ring 12 during separation of this ring from the neck portion 14 by the cutting edge 3b. This insures that the retaining action of the intermediate portion 16 suffices to insure complete separation of the hardened ring 12 from the neck portion 14 while the spring 10 expands to cause the container 15 to be disconnected from the calibrating element 7. A relatively small angular movement of the sleeve 3 suffices to insure satisfactory penetration of the intermediate portion 16 into the still deformable material of the ring 12 during movement of the unit 1 toward the lower end position of FIG. 3 and to insure complete breakage of eventually existing connection(s) between the ring 12 and the neck portion 14 subsequent to intensive cooling of such parts. As mentioned before, the bias of the spring 10 can be selected in such a way that the pin 19 reaches the end position 19' of FIG. 2 before the cutting edge 3b reaches the conical surface 11a in the recess 11 to thus insure that the last stage of the severing operation is carried out while the sleeve 3 is positively compelled to share the axial movement of the blowing mandrel 2. The latter is preferably movable by means of a customary hydraulic or pneumatic cylinder and piston assembly, not shown.

Since the end face 3a of the sleeve 3 is located in a plane which is normal to the axis of the blowing mandrel 2, the container 15 is caused to descend axially or substantially axially as soon as the neck portion 14 is detached from the calibrating element 7 in response to downward movement of the sleeve 3 under the action of the spring 10 and before the ring 12 on the intermediate portion 16 reaches the surface at the underside of the stripping device 21. This insures that the container 15 can descend along a predetermined path and also that there is ample time to move the flap 23 to an intercepting position in which the flap causes the descending ring 12 to enter a path which is different from the path for the container 15. It is clear that the flap 23 or an analogous deflecting or intercepting device can be mounted at a level above the mold 5 and that the movements of the flap can be synchronized with movements of the unit 1 so that the flap moves to its operative position during the interval between the separation of the neck portion 14 from the calibrating element 7 and the separation of the ring 12 from the intermediate portion 16 of the sleeve 3. The interval between complete separation of the neck portion 14 and complete separation of the ring 12 can be very short, as long as it suffices to insure interception of the ring 12 by the flap 23 and to thus prevent the ring 12 from entering the path for the container 15. It is further clear that the flap 23 can be used as a means for intercepting and deflecting the containers 15 and that the rings 12 can descend by gravity without any changes in the direction of their vertical movement. Also, the blow molding machine can be provided with first deflecting or intercepting means for the containers 15 and with second deflecting or intercepting means for the rings 12.

In the embodiment of FIGS. 1 to 4, the severing or cutting device (3a, 3b) forms an integral part of the surplus retaining sleeve 3. However, it is equally within the purview of the invention to provide the blow molding machine with a discrete severing device (see FIGS. 6–10) which is movable with or relative to the blowing mandrel and with referenct to the surplus retaining sleeve.

Figure 5:
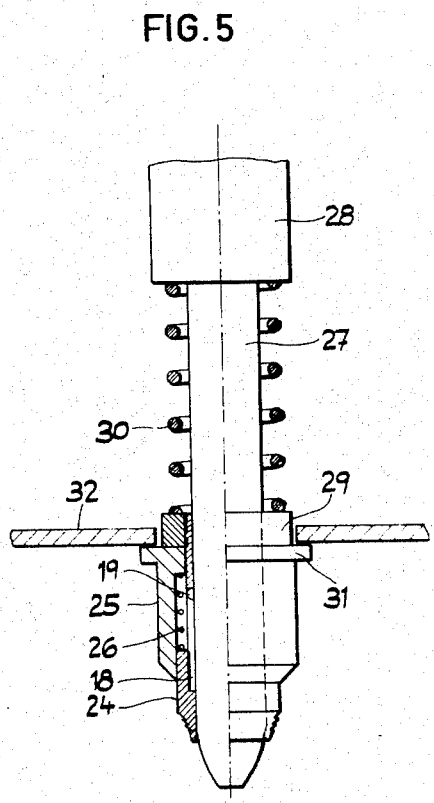
FIG. 5 is a fragmentary axial sectional view of a second blow molding machine employing a modified device for stripping the surplus off the sleeve.

FIG. 5 illustrates a portion of a second blowing and calibrating unit wherein the stripping means for rings (not shown) of surplus thermoplastic material comprises a stationary plate 32 corresponding to the plate 21 of FIGS. 1–4 and a cylindrical stripping member or outer sleeve 25 which is slidable with reference to an inner sleeve 24 corresponding to the surplus retaining sleeve 3 of FIGS. 1–4. The inner sleeve 24 constitutes a plunger which is movable with reference to the outer sleeve 25, and vice versa. A helical spring 26 is mounted in an internal chamber of the outer sleeve 25 and serves to bias the two sleeves axially and away from each other. The extent of movement of the inner sleeve 24 toward the calibrating element 27a of the blowing mandrel 27 is determined by a pin-shaped stop 19" provided on the mandrel 27 and extending into a helical groove 18' of the inner sleeve 24. The upper end portion of the inner sleeve 24 is provided with an annular flange 29 which is biased by a helical spring 30 corresponding to the spring 10 of FIGS. 1–4 and reacting against a boss 28 of the mandrel 27. A flange 31 at the upper end of the outer sleeve 25 normally bears against the flange 29 of the inner sleeve 24 under the action of the spring 26. The diameter of the flange 31 exceeds the diameter of the opening in the plate 32. The flange 29 can constitute a separable nut which meshes with the adjacent portion of the inner sleeve 24. The bias of the spring 30 is stronger than the bias of the spring 26. Thus, when the lower end face of the inner sleeve does not abut against a parison or against the conical surface 11a (FIG. 4) of the mold, and when the flange 31 does not abut against the underside of the plate 32, the spring 30 maintains the inner sleeve 24 in the illustrated lower end position in which the pin 19'' extends into the upper end of the slot 18'. When the flange 31 engages the plate 32 while the mandrel 27 continues to move upwardly, the inner sleeve 24 slides with reference to the outer sleeve 25 and the inner sleeve is simultaneously caused to rotate by the pin 19'' and slot 18' so that the ring (not shown) of surplus material rotates with reference to the neck portion of a freshly formed container and is separated from the neck portion. In response to further upward movement of the mandrel 27, the lower end portion of the outer sleeve 25 separates the ring from the conical portion of the inner sleeve 24 so that the ring descends by gravity and is directed into a predetermined path by a flap or the like, not shown in FIG. 5.

Otherwise the operation of the blow molding machine which embodies the structure of FIG. 5 is analogous to or identical with the operation of the machine shown in FIGS. 1 to 4.

Figure 6:
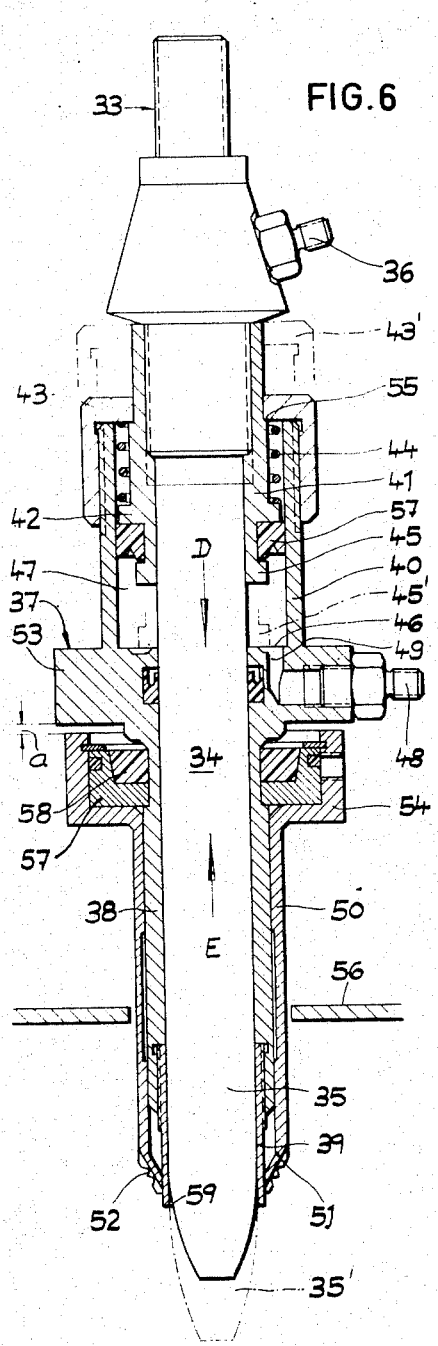
FIG. 6 is a full-size fragmentary axial sectional view of a third blow molding machine with a modified mandrel and with a modified sleeve which does not serve to sever the surplus from the neck portions of containers.

FIG. 6 illustrates in detail and in full size a third blowing and calibrating unit which comprises a vertically reciprocable blowing mandrel 34. The mandrel is shown in a position it assumes upon completion of separation of the neck portion of a freshly finished container from its calibrating element 35 but before the ring of surplus thermoplastic material (not shown) is separated from a surplus retaining sleeve 50 corresponding to the sleeve 3 of FIGS. 1 to 4. The upper end portion 33 of the mandrel 34 is provided with external threads and is connected with the piston rod of a hydraulic or pneumatic cylinder (not shown) serving to move the mandrel 34 in directions directed by the arrows D and E. The configuration of the calibrating element 35 is similar to that of the element 7 or 27; this element cooperates with the adjacent portions of the mold sections to impart to the neck portion of a container a desired configuration and to expel from the mold all such material which is to form the surplus, such as the ring 12 of FIGS. 3 and 4. The mandrel 34 is further connected or provided with a nipple 36 which serves to admit into its axial bore (not shown) a blowing fluid which is introduced into the parison by way of the calibrating element 35 to expand the lower part of the parison into engagement with the surfaces surrounding the mold cavity.

The major part of the blowing mandrel 34 is surrounded by a cylindrical member 37 having a lower part 38 which is in direct sliding contact with and is guided by the mandrel 34. The lower end portion of the part 38 is threadily connected with a discrete sleeve-like severing or cutting device 39 having at its lower end a ring-shaped end face and a cutting edge corresponding to the parts 3a, 3b of the sleeve 3 shown in FIGS. 1 to 4. Instead of being threadedly connected with the part 38, the cutting device 39 can be permanently fitted into or made integral with the cylindrical member 37.

The upper part 40 of the member 37 forms a cylinder which defines a cylinder chamber 47 and accommodates a reciprocable piston 41 having a ring-shaped flange 42 serving as an abutment for the lower end convolution of a helical spring 44 which is mounted in the cylinder 40 and reacts against an internally threaded annular cap 43 meshing with the upper end portion of the cylinder 40. The piston 41 is rigidly connected with the mandrel 34. The spring 44 normally biases the piston 41 in the direction indicated by the arrow D to a lower end position in which the collar 45 at the lower end of the piston assumes the position 45' shown by phantom lines and abuts against an internal ring-shaped surface 46 of the member 37. The surface 46 is located at the lower end of the cylinder chamber 47. The cap 43 then dwells in the position 43' which is indicated by phantom lines and the spring 44 stores a minimum amount of energy.

The cylindrical member 37 is provided with a nipple 48 for admission of pressurized fluid into the chamber 47 by way of one or more ports 49. The part 38 of the member 37 is surrounded by the aforementioned sleeve 50 the lower conical portion 51 of which is provided with ribs, teeth, threads or otherwise configurated projections 52 serving to retain the ring of surplus thermoplastic material during separation of the neck portion of a freshly formed container from the calibrating element 35. Thus, the lower portion 51 of the sleeve 50 corresponds to the intermediate portion 16 of the sleeve 3 shown in FIGS. 1 to 4. It will be seen that the functions of the sleeve 3 of FIGS. 1–4 are performed in part by the cutting device 39 on the cylindrical member 37 and in part by the sleeve 50. The projections 52 on the conical portion 51 of the sleeve 50 penetrate into plastic material while the portion 4 of the parions 6 (not shown in FIG. 6) is still in a deformable state, and the material of the container is then subjected to a rapid and intensive cooling action to insure hardening of the surplus and of the neck portion before the freshly formed container is separated from the calibrating element 35. The cooling action precedes the opening of the mold and follows the admission of gaseous blowing fluid into the parison.

The shaping of the neck portion of a container begins when the mandrel 34 is caused to move in a downward direction (arrow D) so that the calibrating element 35 penetrates into the upper portion of a parison in a closed blow mold. The injection of blowing fluid which is admitted by way of the nipple 36 takes place while the calibrating element 35 dwells in the lower end position 35' which is indicated by phantom lines. The cutting edge of the severing device 39 then abuts against the surface 11a of the conical recess 11 (see FIGS. 1 to 4) of the closed mold so that the ring of surplus thermoplastic material is at least substantially separated from the neck portion of the container in the mold cavity. The portion 51 of the sleeve 50 has penetrated into the ring of surplus material to insure that the ring is retained by the projections 52 when its material hardens in response to intensive cooling. The portion 51 imparts to the ring a conical shape.

The entire blowing and calibrating unit is thereupon caused to move upwardly (arrow E) by the cylinder and piston unit which is connected with the upper end portion 33 of the mandrel 34. When the mandrel 34 covers a predetermined distance from its lower end portion, the nipple 48 is caused to admit into the chamber 47 of the cylinder 40 a pressurized fluid which exerts pressure against the internal surface 46 and causes the member 37 to move downwardly (arrow D) to the extent determined by a small clearance a between an external flange 53 of the member 37 and a cupped arresting portion or extension 54 of the sleeve 50. The nipple 48 is provided on and the port or ports 49 are machined into the flange 53 of the cylindrical member 37. The downwardly moving member 37 shifts the cutting device 39 with reference to the calibrating element 35 in the direction indicated by the arrow D. At the same time, the pressurized fluid which enters the chamber 47 by way of the nipple 48 causes the piston 41 to move upwardly (arrow E) and to stress the spring 44. The mandrel 34 is connected to and thus shares such movement of the piston 41. The upward movement of the piston 41 is terminated when its shoulder 55 engages the underside of the cap 43 which is secured to the member 37. The mandrel 34 then assumes the solid-line position of FIG. 6 and its calibrating element 35 is retracted into the lower part 38 of the member 37 to such an extent that the neck portion of the freshly formed container is separated and descends by gravity. The ring of hardened surplus thermoplastic material is held by the projections 52 on the portion 51 of the sleeve 50. This is due to the fact that the sleeve 50 does not share the upward movement of the mandrel 34 and thus remains in a position in which its portion 51 is spaced from a stationary stripping plate 56.

The pressure in the cylinder chamber 47 is thereupon reduced by a suitable valve in the conduit which admits pressurized fluid to the nipple 48. Consequently, the sleeve 50 begins to share the upward movement of the mandrel 34 in the direction indicated by the arrow E so that the ring of hardened surplus material on the conical portion 51 reaches the surface at the underside of the plate 56 and is stripped off the sleeve 50 to descend by gravity and to be deflected into a predetermined path (other than the path for the finished containers) in a manner as discussed, for example, in connection with FIGS. 1 to 4. The separation of the ring of surplus material from the portion 51 of the sleeve 50 follows the separation of the neck portion from the calibrating element 35 with such a delay that there is ample time for lateral deflection of the container into a first path while the ring descends by gravity along a separate second path, or vice versa.

The numberal 57 denotes a ring-shaped insert which is installed in the cupped portion 54 of the sleeve 50 and abuts against an external shoulder of the part 38. A ring-shaped cushion 58 of elastomeric material is received in the cupped portion 54 and extends into a recess of the insert 57. The flange 53 stresses the cushion 58 when the clearance $a$ is reduced to zero.

The tip 59 of the calibrating element 35 is preferably of conical shape to further facilitate the separation of the neck portion of a freshly formed container from the mandrel 34.

It is clear that the blowing and calibrating unit of FIG. 6 can also embody a device which causes the sleeve 50 to rotate with reference to the mandrel 34 or vice versa to thus further insure that the ring of surplus material is fully separated from the neck portion of the container. However, such rotating means for the sleeve 50 and/or mandrel 34 would constitute an optional feature because the surplus is normally separated from the neck portion when the cutting device 39 and the lower part 38 of the cylindrical member 37 move with reference to the sleeve 50 to reduce the width of the clearance $a$. Such movement is shared by the neck portion which abuts against the lower end face of the cutting device 39 while the surplus remains at a standstill because it is held by the projection 52 on the lower portion 51 of the sleeve 50. Even a very short axial movement of the cutting device 39 with reference to the sleeve 50 (in the direction indicated by the arrow D) suffices to insure reliable separation of the neck portion from the surplus because such movement takes place subsequent to intensive cooling of the surplus and of the neck portion.

FIGS. 7 to 10 illustrate a simple and compact blowing calibrating unit which can be readily installed in existing blow molding machines, i.e., in machines which are not provided with satisfactory means for separating the surplus of plastic material from the neck portion 100 of a bottle, jar or like plastic container 84. The blowing and calibrating unit of FIGS. 7 to 10 can utilize a conventional blowing mandrel 61 which is reciprocable by conventional means, such as a cylinder and piston unit having a motion transmitting piston rod 60. The blowing and calibrating unit may but need not be provided with means for rotating the blowing mandrel 61 with reference to a surplus retaining sleeve 71 or vice versa because it embodies means (analogous to the means described in connection with FIG. 6) for reliably separating the surplus 81 from the neck portion 100 of a freshly formed container 84 before the container is separated from the calibrating element 62 of the mandrel 61. The piston rod 60 can form an integral part of the mandrel 61 and serves to move this mandrel in directions indicated by a double-headed arrow F–G.

The calibrating element 62 of the mandrel 61 is surrounded by a sleeve-like cutting or severing device 63 which corresponds to the cutting device 39 of FIG. 6 but is fixedly secured to the mandrel 61. The lower end face of the cutting device corresponds to the end face 3a of the sleeve 3 of FIGS. 1 to 4 and is surrounded by a cutting edge corresponding to the cutting edge 3b. The upper end portion of the mandrel 61 is provided with a partly cylindrical and partly conical upper enlargement or boss 64 and a cylindrical lower enlargement or boss 65 extending into the uppermost convolution or convolutions of a helical spring 77 which reacts against the underside of the boss 64 and bears against the upper side of a radially outwardly extending projection or flange 70 on the sleeve 71. It is to be noted that many presently employed blowing mandrels are provided with bosses corresponding to the parts 64, 65 of the mandrel 61 shown in FIGS. 7 to 10.

In accordance with a feature of the invention, the lower end portion of the piston rod 60 and the upper boss 64 of the mandrel 61 serve to support a crosshead 67. The upper side of the crosshead 67 abuts against a nut 66 which is connected with the piston rod 60, and this crosshead is provided with two bores 68 which are parallel to the mandrel 61 and receive the shanks of two vertical tie rods 69 having lower ends threadedly connected with the projection or flange 70 of the sleeve 71. The tie rods 69 are slidable in the respective bores 68 of the crosshead 67 and carry at their upper ends pairs of lock nuts 72 which determine the maximum distance between the crosshead and the flange 70.

The lower end portion 75 of the sleeve 71 (which corresponds to the sleeve 50 of FIG. 6) is of conical shape to readily penetrate into a ring of surplus thermoplastic material 81 when the mandrel 61 is caused to enter the upper end portion of a tubular blank or parison 86 in the cavity of the blow mold. The major part of the sleeve 71 is slightly spaced from and defines with the external surface of the mandrel 61 an annular compartment 73. The uppermost part of the sleeve 71 is provided with a bearing sleeve 74 which is slidable on the mandrel 61. The lower portion 75 of the sleeve 71 is provided with teeth, ribs, threads or otherwise configurated retaining projections 76 corresponding to the projections 52 of the sleeve 50 and serving to insure that a ring 81 of hardened surplus material cannot be separated from the sleeve 71 prior to separation of the neck portion 100 of a freshly formed container 84 from the calibrating element 62 of the mandrel 61. The spring 77 which reacts against the underside of the boss 64 bears against the flange 70 and tends to draw the calibrating element 62 of the mandrel 61 and the cutting device 63 into the sleeve 71.

Figure 10:
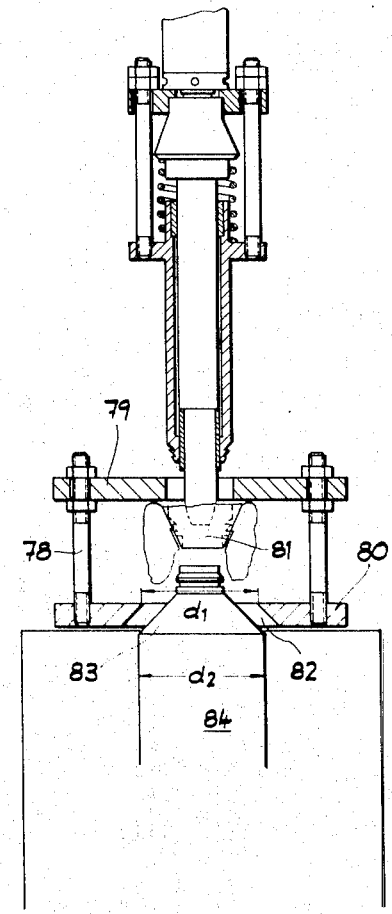
FIG. 10 illustrates the structure of FIG. 7 with the mandrel and sleeve in positions they assume immediately after separation of the neck portion from the mandrel.

The blow molding machine which embodies the just described blowing and calibrating unit further includes two stripping devices, namely, a first plate-like stripping device 80 for finished containers 84 and a second plate-like stripping device 79 for the rings of surplus material 81. The two stripping devices are fixedly mounted in the frame of the blow molding machine and are connected to each other by bolts 78 or analogous distancing elements. The opening of the upper stripping device 79 is large enough to permit unimpeded passage of the sleeve 71 but is too small to permit a ring 81 of surplus material on the portion 75 of the sleeve 71 to pass through the plate 79 when the sleeve 71 moves upwardly from the position shown in FIGS. 8 or 9 toward the position of FIG. 10. The lower stripping device 80 has a relatively large opening 82 which flares outwardly and downwardly, i.e., toward the blow mold, and is just large enough to permit unimpeded passage of the neck portion 100 but not the passage of a conical intermediate portion 83 of the finished container 84. As shown in FIG. 10, the minimum diameter $d1$ of the opening 82 is slightly less than the diameter $d2$ of the main body portion of the container 84. The minimum diameter $d1$ of the opening 82 exceeds the maximum anticipated transverse dimension of the ring 81 of surplus material. The conicity of the surface which surrounds the opening 82 in the lower stripping device 80 preferably corresponds to the conicity of the external surface on the intermediate portion 83 of the container 84 so that the portion 83 is less likely to be deformed by the device 80 if it engages such device while the material of the container 84 is still in a slightly deformable state. Moreover, the surface surrounding the opening 82 can insure that the container 84 is held in an upright position during separation of the neck portion 100 from the calibrating element 62 so that the separated container can descend in a desired direction. Furthermore, the opening 82 can permit passage of an unsatisfactory container (i.e., of a container wherein the diameter of the main body portion is less than the diameter $d1$) so that the unsatisfactory container can be readily detected and preferably automatically segregated from satisfactory containers 84. The unsatisfactory containers can be directed into the same path as the surplus 81.

FIGS. 7 to 10 merely show one of the two sections 85 of a conventional open-and-shut blow mold. The other mold section is located in front of the plane of FIGS. 7-10 and is preferably a mirror symmetrical replica of the illustrated mold section 85. The diameter of the parison 86 exceeds the diameter of the upper portion of the cavity in the mold so that the parison is compressed and deformed by the neck-forming upper parts or portions 87 of the mold sections 85 when the mold is closed and the thus deformed portion of the parison moves into contact with the calibrating element 62 of the mandrel 61. Upon closing of the mold and while the calibrating element 62 extends into the space surrounded by the parts 87 of the mold sections 85, the surplus 81 is formed with two pronounced wings or webs 88. This is due to the provision of shallow recesses 89 in the abutting surfaces of the parts 87 of the mold sections 85. The recesses 89 extend along the parts 87 of the mold sections 85 as well as along those parts 90 of the mold sections which determine the shape of the conical intermediate portion 83 of a container 84. When the mold is closed, the recesses 89 of the two mold sections 85 face each other and define cavities for reception of surplus material which forms the wings 88. Such wings adhere to the annular part of the surplus 81.

In order to insure clean separation of the material of the wings 88 from the material of the intermediate portion 83 and neck portion 100 of the container 84, the mold sections 85 are provided with auxiliary cutting edges 91 which are adjacent to the recesses 89 and extend to the plane in which the surfaces of the mold sections 85 meet when the mold is fully closed. However, the auxiliary cutting edges 91 do not extend along the conical recess 92 of the mold (corresponding to the recess 11 of FIGS. 1-4) so that the surplus can penetrate into the recesses 89 when the mold is being closed by a pair of hydraulic or pneumatic cylinders, not shown. The purpose of the recesses 89 is to permit complete closing of the mold, i.e., to permit the surfaces of the two mold sections 85 to move into full contact with each other. When the material of the surplus 81 sets, the wings 88 adhere to the ring-shaped part of the surplus along their upper inner edges as shown in FIG. 10. The wings 88 can pass through the opening 82 of the lower stripping device 80.

The operation of the apparatus shown in FIGS. 7-10 is as follows:

The mold sections 85 are moved to their closed positions to confine a parison or blank 86. The piston rod 60 is thereupon caused to move the mandrel 61 downwardly toward the mold so that the calibrating element 62 penetrates into the upper portion of the parison 86 until the cutting edge of the severing device 63 strikes against the conical surface surrounding the recess 92. The surplus 81 is thereby at least substantially separated from the neck portion 100 of the container 84. Some material of the surplus flows into the recesses 89 of the mold sections 85 during closing of the mold to form the wings 88. Such material is separated from the portions 83 and 100 of the container 84 by the auxiliary cutting edges 91. Thus, the wings 88 adhere only to the ring-shaped portion of the surplus 81.

The sleeve 71 shares the first stage of the downward movement of the mandrel 61 and its conical lower portion 75 penetrates into and expands the ring-shaped portion of the surplus 81 so that the material of the surplus surrounds and is held by the projections 76. When the resistance to further downward movement of the sleeve 71 overcomes the bias of the spring 77, the sleeve 71 comes to a halt while the mandrel 61 continues to move downwardly so that the spring 77 is stressed. The mandrel 61 is arrested in the position of FIG. 8 in which the upper end face of the sleeve 71 defines with the boss 65 a narrow clearance or gap $b$.

The mandrel 61 thereupon admits into the parison 86 a stream of a gaseous blowing fluid to expand the parison in the mold cavity and to form the main body portion and the intermediate portion 83 of the container 84. The mold is then opened and the pressure in the hydraulic or pneumatic cylinder and piston unit including the piston rod 60 is reduced. Thus, the mandrel 61 is not urged in the downward direction and the surface surrounding the conical recess 92 is moved away from the cutting edge of the severing device 63. Therefore, the pressurized blowing fluid in the finished container 84 starts to gradually move the mandrel 61 upwardly while the spring 77 expands to push the sleeve 71 downwardly until the flange 70 of the sleeve 71 strikes against the upper side of the stripping device 79 (see FIG. 9). The container 84 is still suspended on the calibrating element 62 of the mandrel 61 and the surplus 81 continues to adhere to the portion 75 of the sleeve 71.

Figure 8:
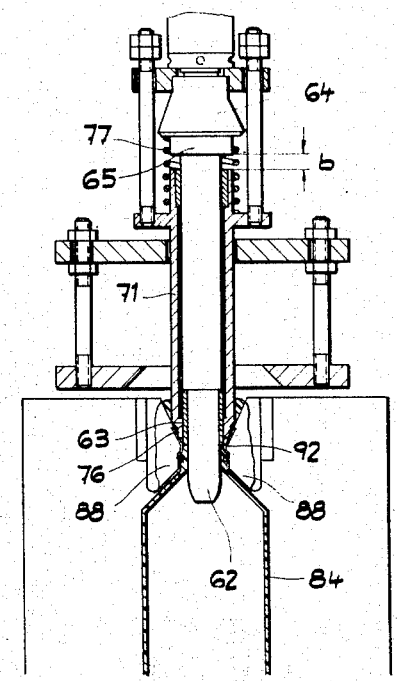
FIG. 8 illustrates the structure of FIG. 7 but with the mandrel and sleeve in the positions they assume upon completion of the blowing step.
Figure 9:
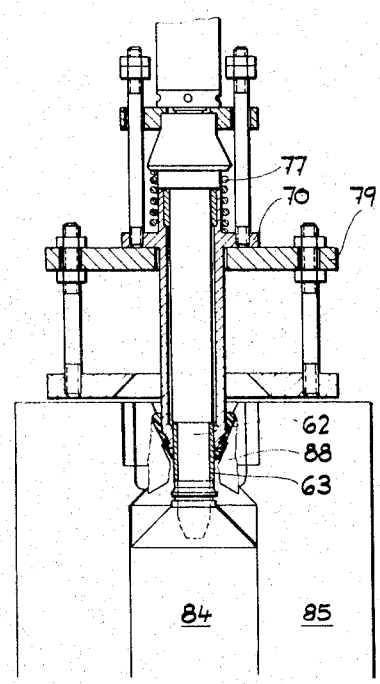
FIG. 9 illustrates the structure of FIG. 8 but with the mandrel in a position it assumes upon completion of separation of the surplus from the neck portion of the container.

In accordance with a feature of the invention, the cylinder and piston unit which includes the piston rod 60 is thereupon caused to move the mandrel 61 downwardly. Since the mold is open, the severing device 63 cannot strike against the surface surrounding the recess 92 so that the mandrel 61 is arrested only when the underside of the boss 65 strikes against the upper end face of the sleeve 71, i.e., the clearance b shown in FIG. 8 is eliminated. Such downward movement of the mandrel 61 is not shared by the sleeve 71 because the flange 70 abuts against the stripping device 79; therefore, the neck portion 100 of the container 84 is moved away from and is fully separated from the surplus 81. Such final separation takes place while the cutting device 63 pushes the neck portion 100 away from that part of the surplus 81 which surrounds the portion 75 and projections 76 of the sleeve 71. It is clear that, at least in many instances, the neck portion 100 of a freshly formed container 84 is fully separated from the surplus 81 even before the clearance b is reduced to zero so that the elimination of such clearance is a safety measure to insure complete separation of eventually existing connection or connections between the neck portion 100 and the surplus 81. It is further clear that the mold is opened and that the mandrel 61 is raised subsequent to intensive cooling of the neck portion 100 and surplus 81. As a rule, the cutting edge of the severing device 63 and the auxiliary cutting edges 91 should insure complete separation of the surplus 81 from the container 84 before the clearance b is reduced in response to renewed downward movement of the mandrel 61 while the flange 70 abuts against the stripping device 79.

Figure 7:
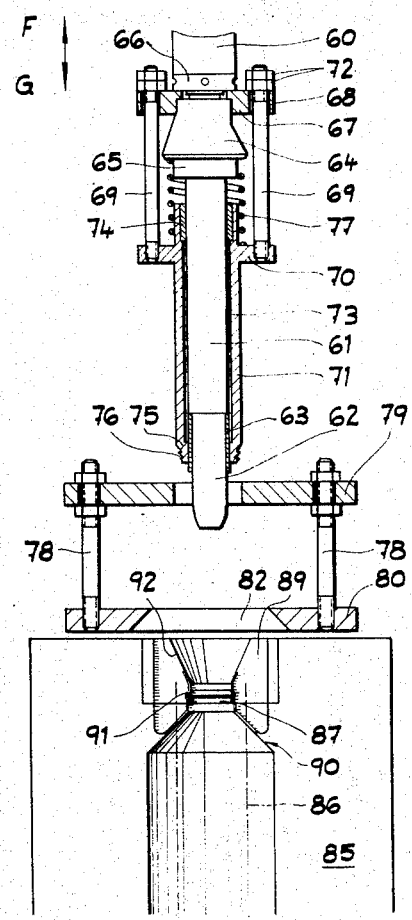
FIG. 7 is a fragmentary vertical sectional view of a fourth blow molding machine with a surplus separating apparatus portions of which can be mounted on a conventional blowing mandrel.

The mandrel 61 is thereupon again caused to move upwardly to reassume the position shown in FIGS. 7 and 10. During the first stage of such movement, the intermediate portion 83 of the container 84 strikes against the stripping device 80 and causes complete separation of the container from the calibrating element 62. The surplus 81 (including the wings 88) thereupon reaches the stripping device 79 and is forcibly separated from the portion 75 of the sleeve 71. The length of the intervals between separation of the container 84 by the lower stripping device 80 and the separation of surplus 81 by the upper stripping device 79 can be selected in advance by appropriate adjustment of the speed of the piston rod 60 and by appropriate selection of the distance between the stripping devices 79, 80. The machine of FIGS. 7-10 can be provided with a suitable deflecting device (corresponding to the flap 23 of FIG. 4) which is moved into the space between the stripping devices 79, 80 subsequent to separation of the container 84 but prior to separation of the surplus 81 so that the surplus is intercepted before it passes through the opening 82. Such deflecting device can also separate from the calibrating element 62 unsatisfactory containers which were able to pass through the opening 82. The surplus 81 and the defective containers are transported into a regenerating unit for renewed use.

In some instances, the lower stripping device 80 can be omitted altogether, for example, when the surplus 81 should be permitted to descend along the same path as a satisfactory container 84. The likelihood of bonding of surplus 81 to finished containers 84 subsequent to separation of the surplus from the sleeve 71 is very remote because the surplus 81 and the containers 84 (or at least the neck portions 100) are subjected to intensive cooling prior to opening of the mold or at least prior to separation from the mandrel 61 and sleeve 71. Thus, the surplus 81 is hard and cannot be welded to the containers 84 without renewed heating. The cooling of the mandrel 61 and its calibrating element 62, of the severing device 63 and of the sleeve 71 can be effected by a coolant which is circulated in the compartment 73.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a blow molding machine wherein deformable thermoplastic blanks are converted into containers having neck portions, a combination comprising an open-and-shut mold arranged to accommodate a blank; a blow mandrel having a calibrating portion and movable axially to introduce said calibrating portion into said mold with attendant conversion of a portion of the blank in said mold into the neck portion of a container and into a ring constituting a surplus of thermoplastic material which adheres to the neck portion; severing means surrounding said mandrel and arranged to cooperate with said mold to effect an at least partial separation of the surplus from the neck portion; a sleeve surrounding said mandrel and arranged to penetrate into the surplus; means for effecting a relative axial movement between said sleeve and said mandrel to thereby lift and completely separate the surplus which is held by said sleeve from the neck portion on said calibrating portion; means on said sleeve for retaining the surplus on said sleeve after penetration of the latter into said surplus and during relative movement between said sleeve and said mandrel; and stripping means for separating the surplus from said sleeve and said means for retaining said surplus on said sleeve.

2. A combination as defined in claim 1, wherein said stripping device comprises a member having an opening large enough to permit passage of said sleeve but too small to permit passage of the surplus so that the surplus is intercepted by said member in response to movement of said sleeve through said opening.

3. A combination as defined in claim 1, wherein said mold has a conical surface and said severing means has an annular cutting edge which severs said portion of the blank and strikes against said conical surface in response to penetration of said calibrating portion into said portion of the blank.

4. A combination as defined in claim 1, wherein said sleeve has a conical portion which is arranged to penetrate into the surplus and is provided with surplus-retaining projections constituting said retaining means.

5. A combination as defined in claim 1, further comprising means for rotating said sleeve with reference to said mandrel in the course of said relative axial movement between said sleeve and said mandrel.

6. A combination as defined in claim 5, wherein said means for rotating comprises a helical slot in said sleeve and a pin secured to said mandrel and extending into said slot.

7. A combination as defined in claim 1, wherein said stripping means comprises a second sleeve surrounding said first mentioned sleeve and means for holding said second sleeve against axial movement while said first mentioned sleeve moves axially to move the surplus against said second sleeve with attendant separation of surplus from said first mentioned sleeve.

8. A combination as defined in claim 7, further comprising resilient means for biasing said sleeves axially and away from each other.

9. A combination as defined in claim 1, wherein said severing means comprises a discrete annular cutting device which is movable axially of said sleeve.

10. A combination as defined in claim 9, wherein said cutting device is movable axially of said mandrel.

11. A combination as defined in claim 10, further comprising a cylinder connected with said cutting device, a piston connected with said mandrel and received in said cylinder, and biasing means for biasing said piston in a direction to withdraw said calibrating portion into said cutting device.

12. A combination as defined in claim 11, wherein said sleeve surrounds said cutting device and a portion of said cutting device normally extends from said sleeve.

13. A combination as defined in claim 9, wherein said cutting device is rigid with said mandrel and said sleeve comprises a projection, said stripping means including a stationary member having an opening for said sleeve and being arranged to intercept said projection to thereby arrest the sleeve while said mandrel moves axially toward said mold, and further comprising resilient means arranged to store energy in response to movement of said mandrel toward the mold while said sleeve is held against movement by said stationary member.

14. A combination as defined in claim 13, further comprising a crosshead secured to said mandrel and tie rods secured to said projection and slidably extending through said crosshead.

15. A combination as defined in claim 14, further comprising means for moving said mandrel axially and including a motion transmitting member connected to the end of said mandrel opposite said calibrating portion, said crosshead being disposed between said end of said mandrel and said motion transmitting member.

16. A combination as defined in claim 1, wherein said mold includes a plurality of sections having surfaces which abut against each other in the closed position of said mold, said surfaces having recesses defining cavities flanking the neck portion of a container in said mold and arranged to receive wing-shaped portions of the surplus in response to introduction of said calibrating portion into said portion of the blank in said mold.

17. A combination as defined in claim 16, wherein said mold sections have cutting edges arranged to sever the wing-shaped portions of the surplus from the container in said mold.

* * * * *